July 25, 1933.   M. M. CODY   1,919,463
METALLIC PACKING AND METHOD OF MAKING THE SAME
Filed Oct. 29, 1930   2 Sheets-Sheet 1
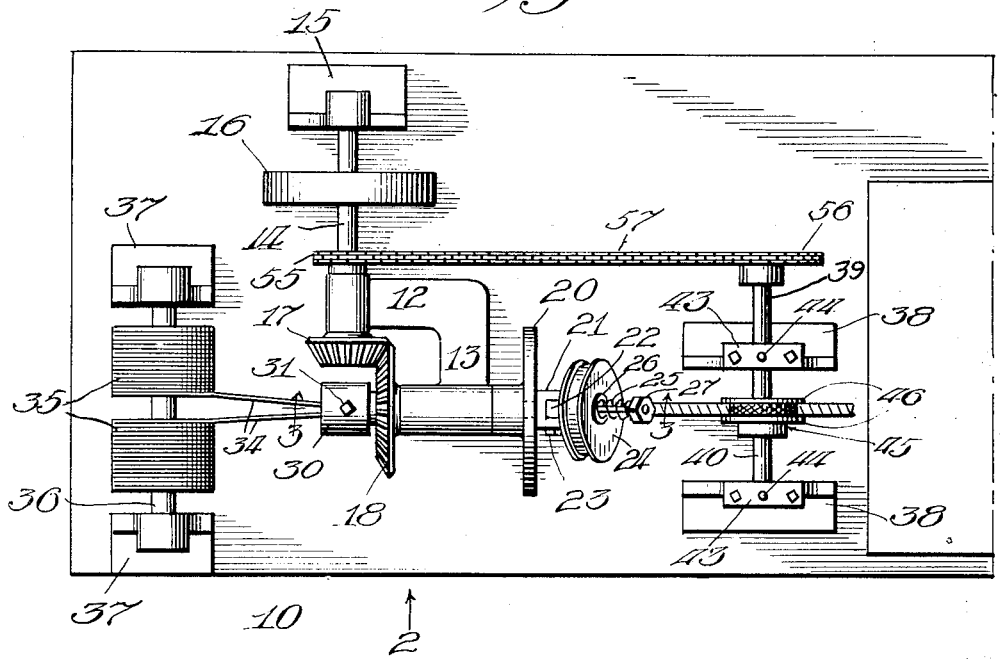
Inventor:
Martin M. Cody
By Rector, Hibben, Davis & Macauley
Attys July 25, 1933.  M. M. CODY  1,919,463
METALLIC PACKING AND METHOD OF MAKING THE SAME
Filed Oct. 29, 1930  2 Sheets-Sheet 2
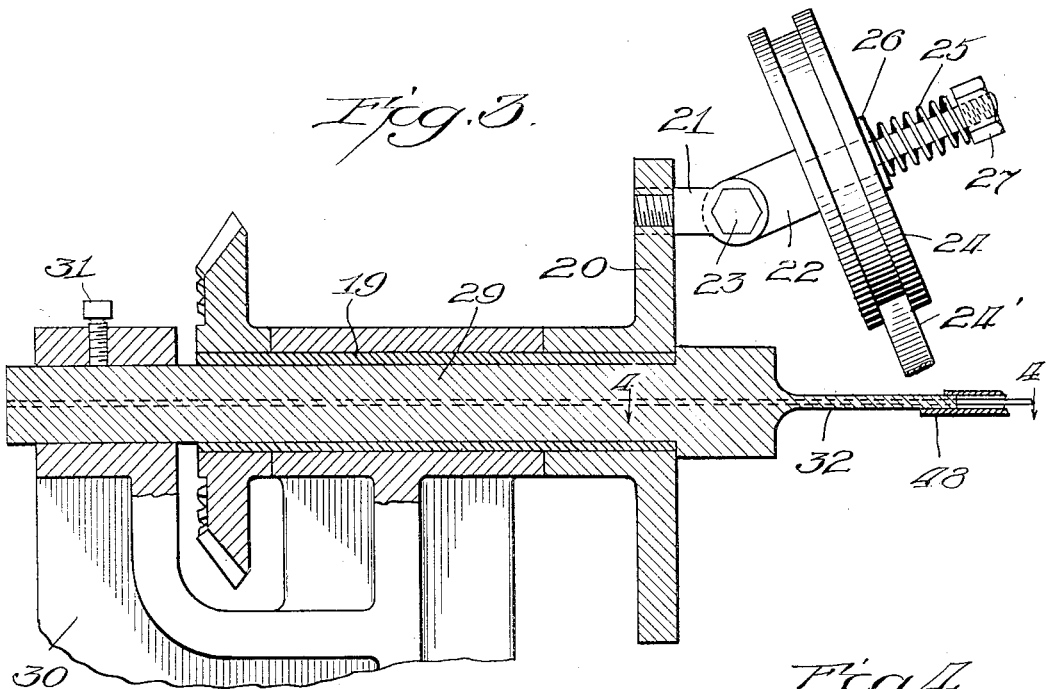
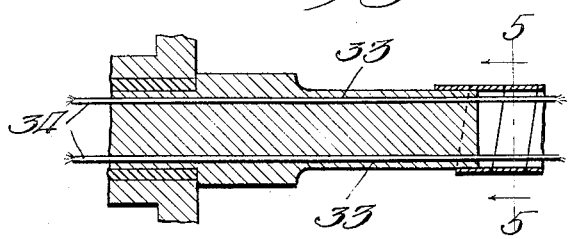
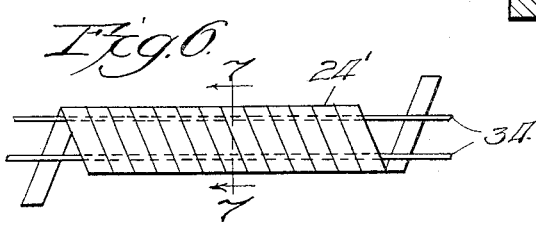
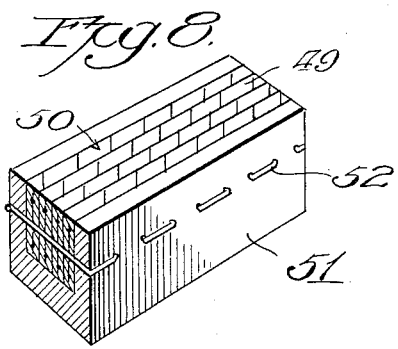
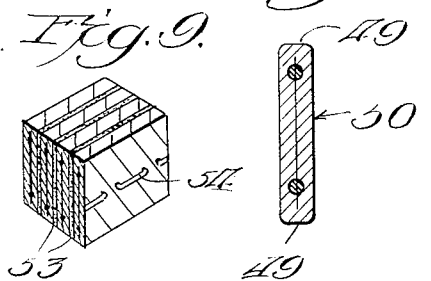
Inventor:
Martin M. Cody Patented July 25, 1933

1,919,463

UNITED STATES PATENT OFFICE

MARTIN M. CODY, OF CHICAGO, ILLINOIS, ASSIGNOR TO CRANE PACKING COMPANY, OF CHICAGO, ILLINOIS, A CORPORATION OF ILLINOIS

METALLIC PACKING AND METHOD OF MAKING THE SAME

Application filed October 29, 1930. Serial No. 491,891.

My invention relates to packing and the method of making same and is concerned principally with the production of a laminated, metallic packing, although the essential conception involved is readily adaptable to packings of the non-metallic type.

One object of my invention is to devise a laminated packing which is intended to provide a highly effective seal with rotary or reciprocating parts, owing to the component elements thereof being arranged for a surface bearing, as contrasted with an edge bearing.

A further object is to provide a packing of the character described which is particularly adapted for sustained service under severe conditions, such as high temperatures, high pressures, and with parts which are operated at a relatively high reciprocatory or rotating speed, the packing functioning under such service without flaking or other internal breakdowns.

A further object is to provide a packing as above indicated which is formed by spiraling a continuous ribbon about a core as a centering and retaining element, the core being flexible in nature to permit bending of the packing strip as may be desired.

A further object is to devise a method of manufacturing packing of the foregoing nature which is characterized by a continuity of operations, rapidity of production, and which requires a relatively small amount of equipment.

These and further objects of my invention will be set forth in the following specification, reference being had to the accompanying drawings, and the novel means by which said objects are effectuated will be definitely pointed out in the claims.

In the drawings:

Figure 1 is a plan view of a suggested form of apparatus which may be employed in effectuating my improved method.

Fig. 2 is a side elevation of the apparatus shown in Fig. 1, as viewed in the direction of the arrow 2 in said figure.

Fig. 3 is an enlarged section taken along the line 3—3 in Fig. 1, looking in the direction of the arrows, certain parts being shown in elevation and showing the manner of securing the wound relation of the ribbon to the core.

Fig. 4 is a section along the line 4—4 in Fig. 3, looking in the direction of the arrows, and showing the manner of passing the core through the stationary mandrel.

Fig. 5 is a section along the line 5—5 in Fig. 4, looking in the direction of the arrows, and showing the relation of the ribbon convolutions to the core, prior to the compressing operation.

Fig. 6 is a plan view of a length of the completed packing strip.

Fig. 7 is an enlarged section along the line 7—7 in Fig. 6, looking in the direction of the arrows, and showing the cross sectional profile of the packing strip.

Fig. 8 is a perspective view of a length of my improved packing, showing the component elements thereof, as illustrated in Figs. 6 and 7, assembled in a suitable holder.

Fig. 9 is a perspective view showing a length of a modified form of packing which comprises a simple assembly of the packing strips without a holder.

Referring to the drawings, the numeral 10 represents a bedplate upon which is mounted a bearing support 11 having bearing arms 12 and 13 which, in plan, are substantially normally disposed to each other, as shown in Fig. 1. One end of a shaft 14 is journaled in the arm 12 and the opposite end of said shaft is journaled in a bearing 15 which is also supported on the bedplate 10. Intermediate the arm 12 and bearing 15, the shaft 14 carries a pulley 16 which may be driven by any suitable source of power and which constitutes the driving pulley for the mechanism presently described.

One end of the shaft 14 extends beyond the arm 12 and has secured thereto a bevel gear 17 which meshes with a bevel gear 18 which is secured to a sleeve 19 that is journaled in the arm 13, the end of said sleeve which is opposite to the gear 18 extending through the bearing portion of the arm 13 for attachment to a face plate 20. Accordingly, a motion of rotation which is imparted to the pulley 16 will cause a corresponding movement to the face plate 20 through the gears and sleeve.

At some convenient, radial distance from the axis of rotation of the face plate 20, a clevis 21 projects from one side of said plate and between the jaws of said clevis is pivotally and frictionally mounted an arm 22 by means of a bolt 23. A portion of said arm may be reduced in diameter, as indicated in Fig. 3, to provide a journal support for a spool 24 upon which may be wound a ribbon 24' of some predetermined material, whether of a metallic nature or otherwise, and which is intended to constitute the principal part of the improved packing as hereinafter described. The reduced portion of the arm 22 extends through and beyond the spool 24 to receive a coil spring 25, one end of which abuts against the washer 26, which encircles the reduced portion of said arm and which also abuts against the spool 24, and the other end of said spring is contacted by a nut 27 which is threaded on said arm. According to the foregoing disposition of the spool 24, the angular relation between the axes thereof and of the face plate 20 may be regulated as desired in order to vary the slope of the convolutions of the ribbon when wound to form the strip packing as hereinafter described, while the spring 25 and allied parts enable sufficient frictional retardation to be imposed on the spool 24 during the winding movement of the ribbon, so that the necessary degree of tautness is maintained on the moving ribbon during its withdrawal from the spool to thereby obviate any tendency of the ribbon to pile or otherwise jam by reason of overrunning.

A mandrel 29 extends through the sleeve 19, one end of said mandrel being fixedly mounted in an arm 30 by means of a conventional set screw 31, although other fastenings may be adapted as desired, the arm 30 constituting a part of the bearing support 11. The opposite end of the mandrel 29 extends beyond the face plate 20 and the extremity of said mandrel, for any convenient distance from the indicated end thereof, may be reduced in thickness, as at 32, to form a substantially rectangular cross section. A pair of spaced, parallel holes 33, 33 are provided within the mandrel 29, the horizontal axes of said holes preferably lying in a plane which is parallel to the plane of the bedplate 10, although other relations may be adapted, dependent upon the nature of the packing desired. The holes 33 extend completely through the mandrel 29, including the reduced portion 32 thereof and are intended to serve as ducts for the passage therethrough of cords 34, which it will be understood are generally representative of flexible members, such as twine, soft wire, and the like, the cords 34 being led from spools 35, 35 which are journaled in axially spaced relation on the shaft 36 whose ends are carried in bearings 37, 37 also mounted on the bedplate 10.

A pair of bearings 38, 38 is also mounted on the bed plate 10, on the side of the bearing support 11 which is opposite to the spools 35, and within the bearings 38 being disposed on opposite sides of a vertical plane which includes the axis of the sleeve 19, as shown clearly in Fig. 1. A shaft 40 is vertically disposed above the shaft 39 and has its ends journaled in blocks 41 which are slidably mounted in the upper ends of the bearings 38, channels or slots 42 being provided in the upper ends of said bearings to receive the blocks 41. The upper, or open, ends of the slots 42 are bridged by bars 43 and adjusting screws 44 are threaded in said bars for engagement with the blocks 41 whereby the vertical relation of the shaft 40 to the shaft 39 may be regulated as desired, for a purpose presently explained. A roller 45, preferably having circumferential side flanges 46, is mounted on the shaft 40 and a roller 47 is secured to the shaft 39 in cooperative relation to the roller 45. The coacting peripheries of the rollers 45 and 47, or of either one thereof, may be knurled in order to insure an effective drawing contact with the packing strip as hereinafter explained and it is also contemplated that the thickness of the roller 47 will be such as to enable it to be received between the flanges 46 on the roller 45, thereby confining passage of the packing strip in its movement between the rolls. The extremity of the shaft 39 projects beyond the upper bearing 38, as viewed in Fig. 1, to fixedly receive a sprocket 56 which is driven by a chain 57 that engages a sprocket 55 on the shaft 14, thereby providing for rotary movement of the rollers 45 and 47.

In manufacturing my improved packing, the cords 34 will first be passed through the holes 33 until the ends thereof project beyond the reduced portion 32 of the mandrel 29 and the spool 24 will be adjusted to provide the necessary slope for the convolutions of the ribbon. The face plate 20 will then be given a slow motion of rotation, carrying with it the ribbon spool 24 and accordingly winding said ribbon about the reduced mandrel portion 32. As these convolutions are formed on the portion 32, they and the cords 34 which are enclosed thereby, are carried by hand, or a suitable tool, for passage between the rollers 45 and 47, said rollers having been previously adjusted to establish the necessary compressing and drawing contact with the packing strip thus formed. The rollers therefore compress the packing strip into the form presently described, as well as drawing the cords from the spools 35 and the successive ribbon convolutions from the mandrel 29.

Initial contact of the packing strip having been effected between the rollers 45 and 47, the manufacture of the strip may now proceed automatically. A definite speed of rotation being imparted to the pulley 16, the ribbon spool 24 takes up its combined movement comprising a revolving motion about the axis of the face plate 20 and a motion of rotation about its own axis to thereby form the successive ribbon convolutions, denoted by the numeral 48, about the reduced portion 32. At the same time, the cords 34 are moving toward the right, as viewed in Fig. 1, at a constant rate of speed, owing to their being gripped between the ribbon convolutions then being compressed between the rollers 45 and 47. The frictional contact between said rollers and the portion of the packing strip therebetween insures the withdrawal of the convolutions 48 from the reduced mandrel portion 32 as successively formed thereon, the relation of the ribbon convolutions to the cords 34, intermediate the end of the portion 32 and the rollers 45 and 47, being generally as shown in Fig. 5, with the cords free of any rigid contact with the inner walls of the ribbon convolutions. However, as soon as the packing strip passes between the rollers 45 and 47, the compression thereby ingendered flattens the ribbon convolutions into the form shown generally in Fig. 7, said convolutions then closely gripping the cords 34 which thereafter function as cores to prevent separation of the ribbon convolutions, although permitting a slight relative movement thereof by reason of the flexible nature of the cords and in order to permit bending of the packing around a rotary or reciprocating part.

In winding the ribbon 24' about the portion 32, the successive ribbon convolutions are located in the closely abutting relation shown in Fig. 6 and when the assembly of cords and ribbon convolutions is compressed as above described, the resulting packing unit formed presents side surfaces 49 (see Fig. 7) which afford a bearing area of some extent and considerably more efficient than the edge contact presented by packing units formed of single thicknesses of material. In my improved packing, the component units thereof have bearing surfaces with a cross sectional dimension substantially equal to twice the thickness of the material employed in making the units. Tendency of the packing units to flake, or to otherwise undergo disintegration under severe operating conditions, is largely obviated, without any lessening of the capacity of the packing to perform its primary purpose as a sealing agent. The ribbon may be formed of lead, aluminum, copper, or other suitable metals or alloys thereof and it has been ascertained that ribbon thickness of from $\frac{1}{16}$ inch to $\frac{1}{8}$ inch gives good results, although it will be understood that no interpretative restriction is to be placed on these sizes.

In making a length of packing composed of the foregoing packing units, any desired number of the packing strips 50 are positioned in a holder 51 which, in Fig. 8, is designated as a simple channel member, although it may partake of other shapes. The material of the holder will depend upon the particular operative conditions under which the packing is to be used, although asbestos has been found to be adequate for a majority of uses. In the channel form of holder, the packing strips 50 are assembled therein with the side faces 49 presented outwardly and with any one packing strip so disposed with reference to the adjoining packing strips on opposite sides thereof, that the respective meeting faces of the successive convolutions occupy a staggered relation to each other, as shown clearly in Fig. 8, which relation of the packing strip, of course, assists in preventing seepage of the fluid which it is desired to seal along the shaft. After locating the packing strips within the holder as just described, graphite may be forced between the strips to make the packing self-lubricative and the whole assembly may then be united by means of stitching 52, or some other mode of interconnection which would not prevent the packing from being bent to encircle the shaft.

In the modification illustrated in Fig. 9, the holder 51 is eliminated and the strips 50 simply interleaved with strips 53 of fabric, asbestos, or other suitable material, which may be impregnated or covered with graphite for the same purpose as noted before. The relation of the ribbon convolutions in adjoining strips is similar to that shown in Fig. 8 and stitching 54 may be employed to secure the assembly together.

Packing may be manufactured according to the foregoing method with considerable rapidity and as a continuous operation within the maximum capacities of the ribbon spool 24 and the cord spools 35. The mechanism required is of a comparatively simple nature, necessitating a minimum of care on the part of the operator and being comparatively free from breakdown interruptions. The packing itself is comparatively simple in nature and embodies all the requirements of a flexible strip packing, while in addition, being capable of use under severe operating conditions as regards high temperatures, pressures and rotative and reciprocating speeds.

While I have shown one set of elements and combinations thereof for effectuating my improved packing and the method of making the same, it will be understood that the same is intended for purpose of illustration only and in no wise to restrict the article to the exact forms, structures and steps shown, for many changes may be made therein without departing from the spirit of my invention.

I claim:

1. Laminated packing comprising an interleaved assembly of strips formed of metallic ribbon convolutions and strips of non-metallic material, and means for holding said assembly together.

2. Laminated packing comprising an interleaved assembly of strips formed of metallic ribbon convolutions and strips of non-metallic material carrying a lubricating substance, and means for holding said assembly together.

3. Laminated packing comprising an interleaved assembly of strips formed of metallic ribbon convolutions and strips of non-metallic material, and stitches passing through all of said strips for holding the same in assembled relation.

MARTIN M. CODY.